US006791671B1

(12) United States Patent
Hayashi et al.

(10) Patent No.: US 6,791,671 B1
(45) Date of Patent: Sep. 14, 2004

(54) IMAGE FIXING APPARATUS

(75) Inventors: Nobuhiro Hayashi, Tokyo (JP); Hiroyuki Arakawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/324,654

(22) Filed: Jun. 3, 1999

(30) Foreign Application Priority Data

Jun. 5, 1998 (JP) .......................................... 10-172125

(51) Int. Cl.[7] ........................ G03B 27/00; G03G 15/20; H05B 1/00

(52) U.S. Cl. .......................... 355/405; 399/68; 219/216

(58) Field of Search ............................ 355/405; 399/68, 399/69, 67, 328, 327; 219/216

(56) References Cited

U.S. PATENT DOCUMENTS 5,552,874 A * 9/1996 Ohtsuka et al. ............. 355/285
5,621,511 A 4/1997 Nakayama ................... 399/44
6,160,974 A * 12/2000 Yoshikawa et al. ........... 399/68

FOREIGN PATENT DOCUMENTS

| | | |
|---|---|---|
| JP | 54-80135 | 6/1979 |
| JP | 4-181980 | 6/1992 |
| JP | 7-092850 | 4/1995 |

OTHER PUBLICATIONS

US 6,096,996, 8/2000, Hirose et al. (withdrawn)*

* cited by examiner

*Primary Examiner*—Peter B. Kim
(74) *Attorney, Agent, or Firm*—Fitzpatrick, Cella, Harper & Scinto

(57) ABSTRACT

Disclosed is an image fixing apparatus for use in an image forming apparatus for forming an image on a recording medium. During a process of continuously forming an image on a plurality of recording media, the recording medium feeding speed is switched when the temperature of a fixing roller has dropped to a particular value which is set depending on the rate at which the temperature of the fixing roller drops.

9 Claims, 6 Drawing Sheets

IMAGE FIXING APPARATUS

BACKGROUND OF THE INVENTION

1. Field of the Invention

The present invention relates to an image fixing apparatus used in an image forming apparatus such as a copying machine, printer, facsimile, etc.

2. Description of the Related Art

In a typical conventional fixing apparatus, a recording medium on which an image has been formed is passed through a nip formed between a cylindrical fixing roller and a cylindrical pressure roller so that the recording medium is heated by a halogen heater serving as heating means disposed in a hollow of the fixing roller thereby fixing the image on the recording medium. The temperature of the fixing roller is detected by a thermistor temperature sensor (hereinafter referred to simply as a thermistor) disposed in contact with the circumferential surface of the fixing roller.

During a continuous fixing process for a plurality of recording media, the temperature of the fixing roller is controlled for example as follows. The temperature at the circumferential surface of the fixing roller is detected using the thermistor during the continuous fixing process for the plurality of recording media. If the temperature detected by the thermistor becomes lower than a recording medium feeding interval switching temperature which is predetermined without taking account the type and the size of recording media and without taking account the effects of changes in the environmental conditions, the recording medium feeding interval at which the recording media are fed to the nip is increased (that is, the number of recording media fed per unit time is reduced). This temperature controlling method is disclosed for example in Japanese Patent Laid-Open No. 54-80135.

The above-described technique is based on the idea that good fixing capabilities are maintained by controlling the recording medium feeding interval regardless of a reduction in the temperature of the fixing roller.

However, in the method of controlling the fixing temperature according to Japanese Patent Laid-Open No. 54-80135, the interval of feeding recording media to the nip is switched when the temperature detected by the thermistor becomes equal to the feeding interval switching temperature which is determined without taking account the type of the recording media and the changes in the environment conditions, it is difficult to maintain the surface temperature of the fixing roller within the allowable range of fixing temperature during the entire fixing process for a user-specified number of recording media.

When recording media have a large weight per unit area (hereinafter such a recording medium will also be called thick paper), the recording media absorb a large amount of heat from the fixing roller during the fixing process. Conversely, when recording media have a small weight per unit area (hereinafter such a recording medium will also be called thin paper), the recording media absorb a small amount of heat from the fixing roller during the fixing process.

The amount of heat that a recording medium absorbs from the fixing roller during the fixing process varies depending on the environments in which the apparatus is used, no matter which type of recording medium is employed.

Therefore, even if the number of recording media fed per unit time is reduced when the temperature of the fixing roller has dropped to the feeding interval switching temperature, there is a possibility that, if there are a larger number of remaining recording media to be fixed, the temperature of the fixing roller will further drop below the minimum allowable fixing temperature.

The reduction in the recording medium feeding speed results in a reduction in the processing speed of the apparatus. From the viewpoint of productivity, it is desirable that the reduction in the recording medium feeding speed be as small as possible.

Thus, it is desired to improve the conventional fixing sequence so that it will be capable of accommodating various types of recording media and handling changes in the environmental conditions.

SUMMARY OF THE INVENTION

In view of the above, an object of the present invention is to provide an image fixing apparatus capable of entirely fixing a specified number of recording media without generating fixing defects.

It is another object of the present invention to provide an image fixing apparatus capable of utilizing the full fixing capacity.

According to an aspect of the invention, to achieve the above objects, there is provide an image fixing apparatus comprising: a heating member controlled to keep a first temperature; a back-up member cooperable with the heating member to form a nip through which a recording medium passes; feeding rate control means for controlling the rate of feeding recording media per unit time in such a manner that the rate of feeding recording media per unit time is reduced when the temperature of the heating member has dropped to a second temperature lower than the first temperature; and temperature setting means for setting the second temperature in accordance with the rate at which the temperature of the heating member changes when a plurality of recording media are continuously passed through the nip.

According to another aspect of the present invention, there is provided an image fixing apparatus comprising: a heating member controlled to keep a first temperature; a backup member cooperable with the heating member to form a nip through which a recording medium passes; and feeding rate control means for controlling the rate of feeding recording media per unit time during a process of continuously fixing a specified number of recording media, in such a manner that when the temperature of the heating member has dropped to a second temperature lower than the first temperature, the feeding rate per unit time for the remaining recording media is determined depending on the number of remaining recording media.

These and other aspects, features, and objects of the present invention will become more apparent from the following detailed description of preferred embodiments as illustrated in the accompanying drawings.

DESCRIPTION OF THE PREFERRED EMBODIMENTS

The invention is described in further detail below with reference to preferred embodiments in conjunction with the accompanying drawings.

First Embodiment

Referring to FIGS. 1 to 5, a first embodiment of the present invention is described below.

Figure 1:
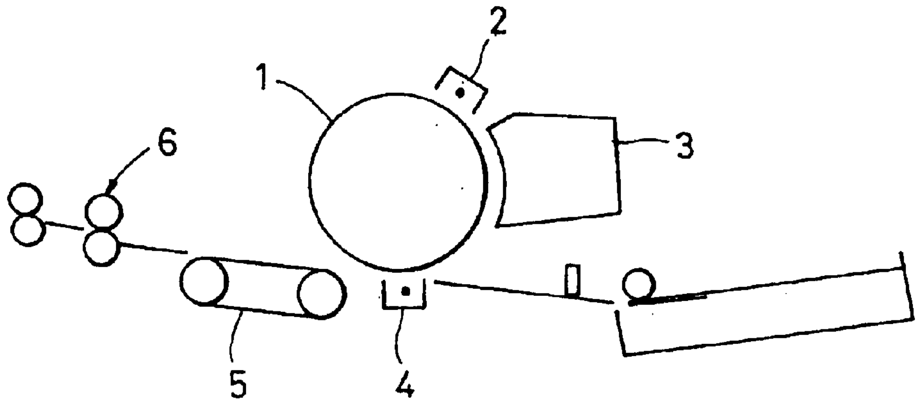
FIG. 1 is a cross-sectional view schematically illustrating the construction of an image forming apparatus according to a first embodiment of the present invention.

FIG. 1 is a cross-sectional view schematically illustrating the construction of an electrophotographic copying machine (hereinafter simply referred to as a copying machine) which is a preferable embodiment of an image forming apparatus of the present invention.

In this embodiment, the copying machine includes a rotatable drum-shaped latent image holding member 1 having a photosensitive material disposed around the circumferential surface thereof, a primary charger 2 for charging the circumferential surface of the latent image holding member 1, a developing unit 3 for developing the latent image with a developer so as to convert the latent image, formed in accordance with image information light and held on the circumferential surface of the latent image holding member 1, to a visual developer image, and an image transfer unit 4 for transferring the developer image on the circumferential surface onto a recording medium, wherein the primary charger 2, the developing unit 3 and the image transfer unit 4 are disposed around the latent image holding member 2 whereby an image forming process is accomplished.

A fixing apparatus 6 is disposed on the downstream side, in the recording medium conveying direction, of the image transfer unit 4. After transferring the image onto the recording medium, the recording medium is conveyed by a transport 5 from the image transfer unit 4 to the fixing apparatus 6.

The fixing apparatus 6 performs a fixing process on the recording medium having the image which was transferred when it was passed through the transfer space between the latent image holding member 1 and the image transfer unit 4, whereby a permanent image corresponding to the information provided from the outside is formed on the recording medium.

In the present embodiment, the image forming process is accomplished in accordance with image information supplied from an external device such as a personal computer.

Figure 2:
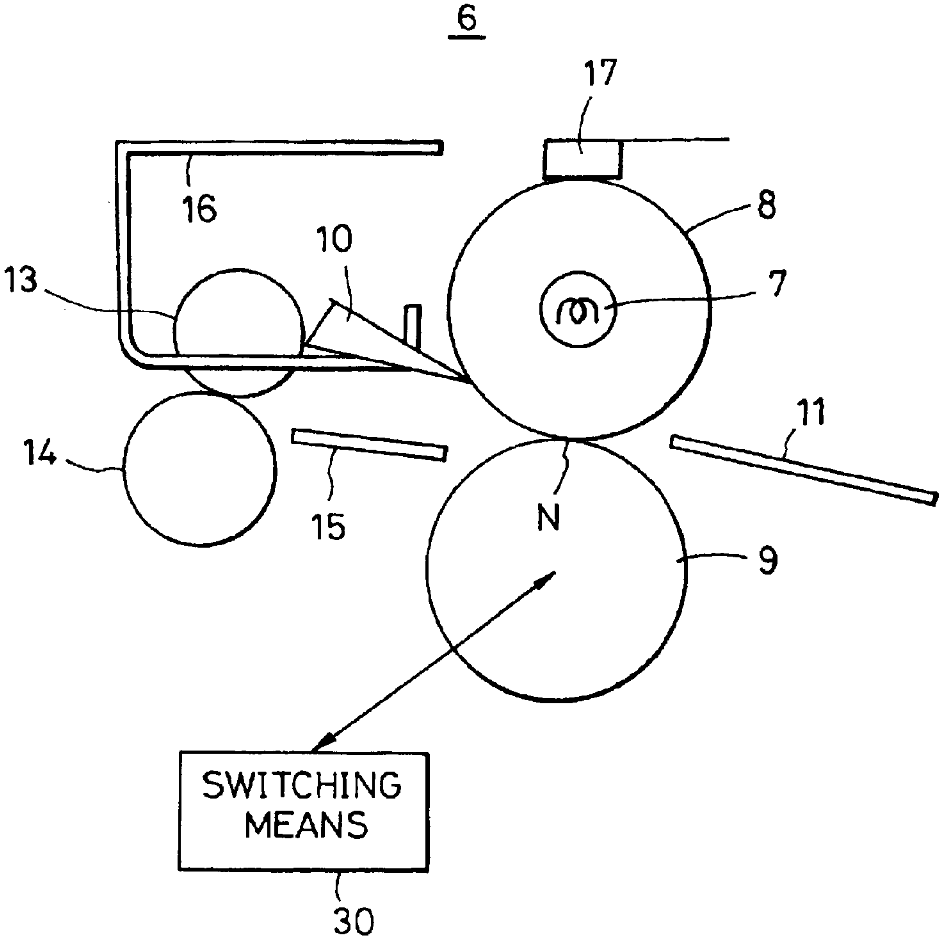
FIG. 2 is a cross-sectional view schematically illustrating the construction of the fixing apparatus used in the image forming apparatus shown in FIG. 1.

Referring now to FIG. 2, the fixing apparatus 6 is described below. FIG. 2 is a cross-sectional view schematically illustrating the construction of the fixing apparatus 6.

As shown in FIG. 2, the fixing apparatus 6 includes a halogen heater (hereinafter referred to simply as a heater) 7 serving as heating means, a cylindrical- or substantially cylindrical-shaped rotatable fixing roller 8 serving as a fixing member, a cylindrical- or substantially cylindrical-shaped rotatable pressure roller 9 serving as a pressure member, and a thermistor temperature sensor (hereinafter referred to simply as a thermistor) 17 serving as a temperature detecting member.

The heater 7 is disposed in a hollow formed in the fixing roller 8 such that it extends along the axis of the fixing roller 8. Electric power is supplied to the heater 7 from a commercial power supply (not shown) so that the temperature detected by the thermistor is maintained at a predetermined target value thereby controlling the temperature of the fixing roller 8.

A pressing mechanism (not shown) disposed outside the fixing apparatus 6 urges the pressure roller 9 against the fixing roller 8 so as to form a nip N between the fixing roller 8 and the pressure roller 9 urged against to the fixing roller 8 so that a recording medium on which an image to be fixed has been formed is passed through the nip N.

In the present embodiment, either the fixing roller 8 or the pressure roller 9 is driven by a driving mechanism (not shown) disposed outside the fixing apparatus 6. The other roller rotates following the rotation of the directly-driven roller.

Thus, the recording medium is guided through an inlet shoot 11 to the nip N. As the fixing roller 8 and the pressure roller 9 rotate, the recording medium is further conveyed toward a space between a lower shoot 15 and an upper shoot 16.

The thermistor 17 is disposed such that it is in contact with the outer circumferential surface of the fixing roller 8 so that the timing of turning on/off the power to the heater 7 is controlled in accordance with the temperature detected by the thermistor 17.

The fixing process performed by the fixing apparatus 6 is described below.

After an image was transferred by the image transferring apparatus 4 onto a recording medium, the recording medium is guided to the nip N through the inlet shoot 11. The leading end of the recording medium is nipped between the fixing roller 8 and the pressure roller 9 urged against the fixing roller 8, and the feeding of the recording medium through the nip N is started.

When the recording medium is passed through the nip N, the image is fused in a part-by-part fashion by heat generated by the heater 7 and the image is permanently fixed. The already-fixed part of the recording medium is separated from the circumferential surface of the fixing roller 8 by a stripper finger 10 disposed on the downstream side, in the direction of rotation of the fixing roller, of the nip N. The recording medium is then conveyed to the outside of the fixing apparatus 6 through a pinch roller 13 and an exit roller 14 which rotate while keeping contact with each other.

During the process of continuously fixing a plurality of recording media, the speed at which the recording medium is fed through the nip N, or the recording medium feeding rate per unit time, is switched in accordance with the method of the present embodiment as described below referring to FIG. 3.

Figure 3:
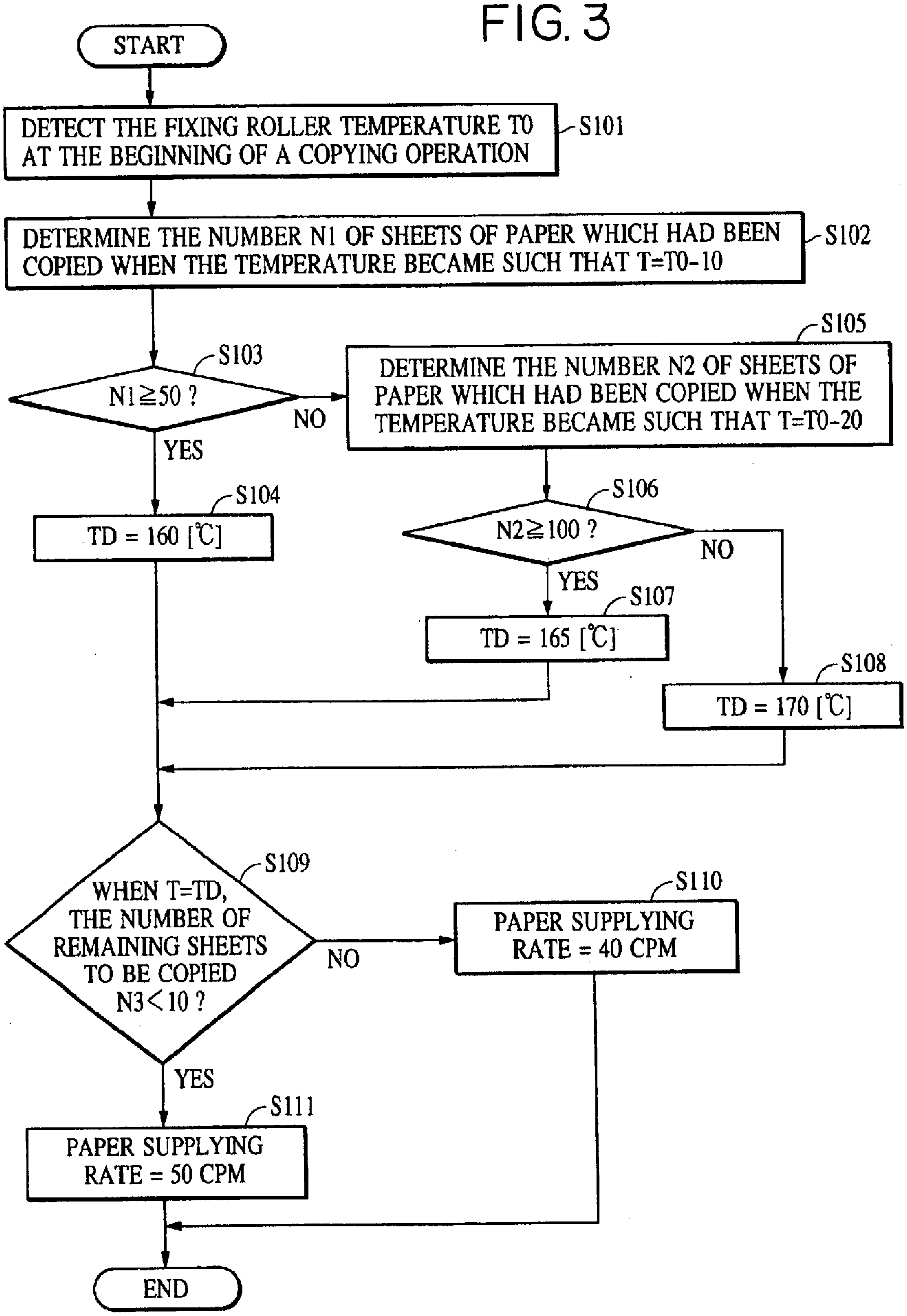
FIG. 3 is a flowchart illustrating an algorithm of switching the speed at which a recording medium is fed to a nip during a process of continuously fixing a plurality of recording media according to a first or second embodiment of the invention.

FIG. 3 is a flowchart illustrating an algorithm of switching the recording medium feeding speed according to the present embodiment.

In the present embodiment, as shown in FIG. 2, the recording medium feeding speed, at which each recording medium is fed through the nip N during a continuous multiple-sheet fixing process, is controlled by switching means 30 disposed outside the fixing apparatus 6.

In the present embodiment, the switching means 30 switches the recording medium feeding speed when the temperature of the fixing roller drops to a particular value (reference temperature) which is selected from a plurality of predetermined values, depending on the number of recording media which can be fixed before a predetermined amount of reduction occurs in the temperature detected by the thermistor 17.

The sequence is described in further detail below. Herein, the normal processing rate of the apparatus is assumed to be 50 cpm. At the beginning of a process of continuously fixing a user-specified number of recording media, the surface temperature T0 of the fixing roller 8 is detected via the thermistor 17 (step S101). In this specific embodiment, the temperature is set such that a first recording medium is fixed at 200° C.

The temperature T detected by the thermistor 17 decreases with the proceeding of the fixing process. When the temperature T detected by the thermistor 17 has dropped to T0−10, the number N1 of recording media which have been already subjected to the fixing process is determined (step S102). Then it is determined whether the number N1 of already-fixed recording media is equal to or greater than 50 (step S103).

If the number N1 of already-fixed recording media is equal to or greater than 50, the reference temperature TD at which the recording medium feeding speed is switched by the switching means 30 is set to 160° C. (step S104).

On the other hand, if the number N1 of already-fixed recording media is less than 50, then the number N2 of recording media, which can be fixed before the temperature T detected by the thermistor 17 drops to T0−20, is determined (step S105). The number N2 of already-fixed recording media is then checked to determine whether N2 is equal to or greater than 100 (step S106).

If the number N2 of already-fixed recording media is equal to or greater than 100, then the reference temperature TD is set to 165° C. (step S107).

On the other hand, if the number N2 of already-fixed recording media is less than 100, the switching temperature TD is set to 170° C. (step S108).

During the continuous fixing process, if the temperature T detected by the thermistor 17 becomes equal to the reference temperature TD, it is determined whether the number N3 of remaining recording media to be fixed is less than 10 (step S109).

If the number N3 of remaining recording media to be fixed is equal to or greater than 10, the switching means 30 switches the recording medium feeding speed from 50 cpm to 40 cpm almost immediately after the detection of a drop of the temperature to the reference temperature TD thereby accounting for a predicted further reduction in the surface temperature of the fixing roller 8 (step S110).

When the number N3 of remaining recording media to be fixed is less than 10, it is predicted that the final recording medium will be fixed before the surface temperature of the fixing roller 8 will become lower than the minimum allowable fixing temperature. Thus, the recording medium feeding speed is maintained at 50 cpm even if the temperature detected by the thermistor becomes equal to the reference temperature TD.

Figure 4:
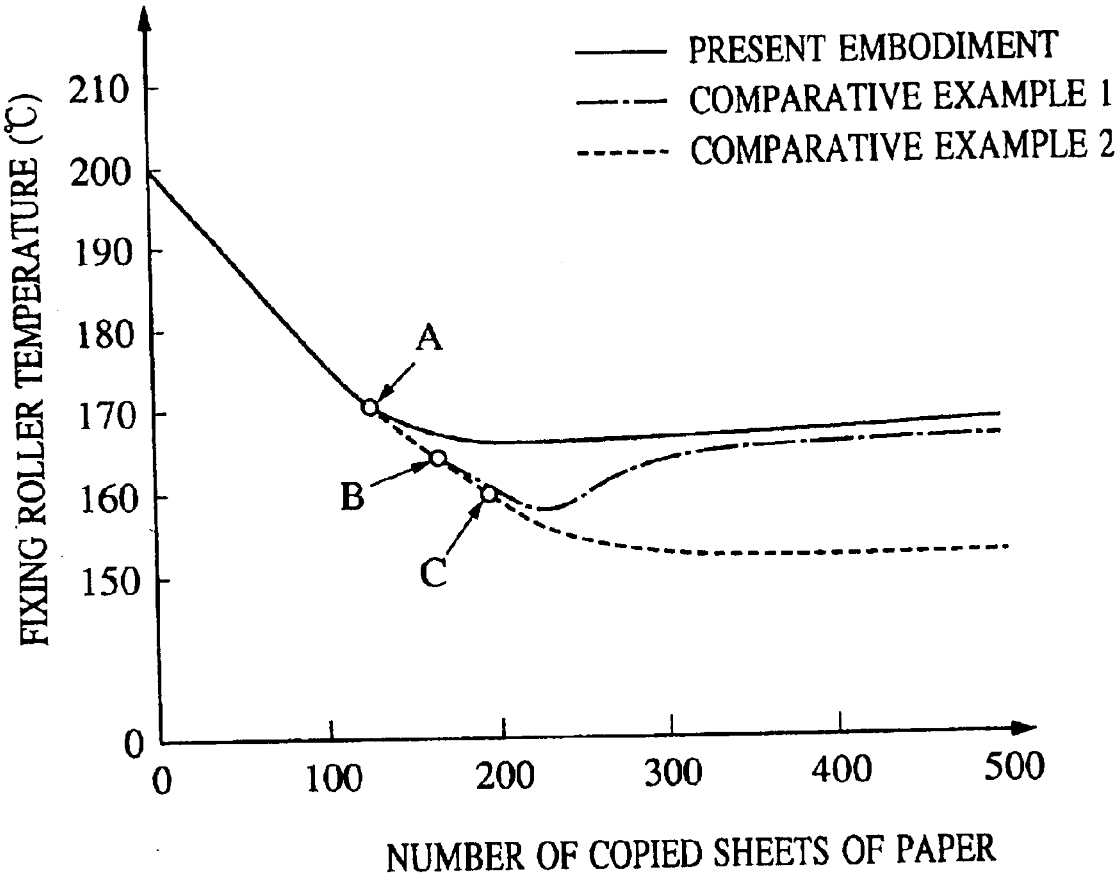
FIG. 4 is a graph showing a change in the surface temperature of the fixing roller during a process of continuously fixing a plurality of sheets of A4-size paper with a weight of 90 $g/m^2$ employed as the recording media at an ambient temperature of 15° C., for three different conditions in terms of switching of the recording medium feeding speed.
Figure 5:
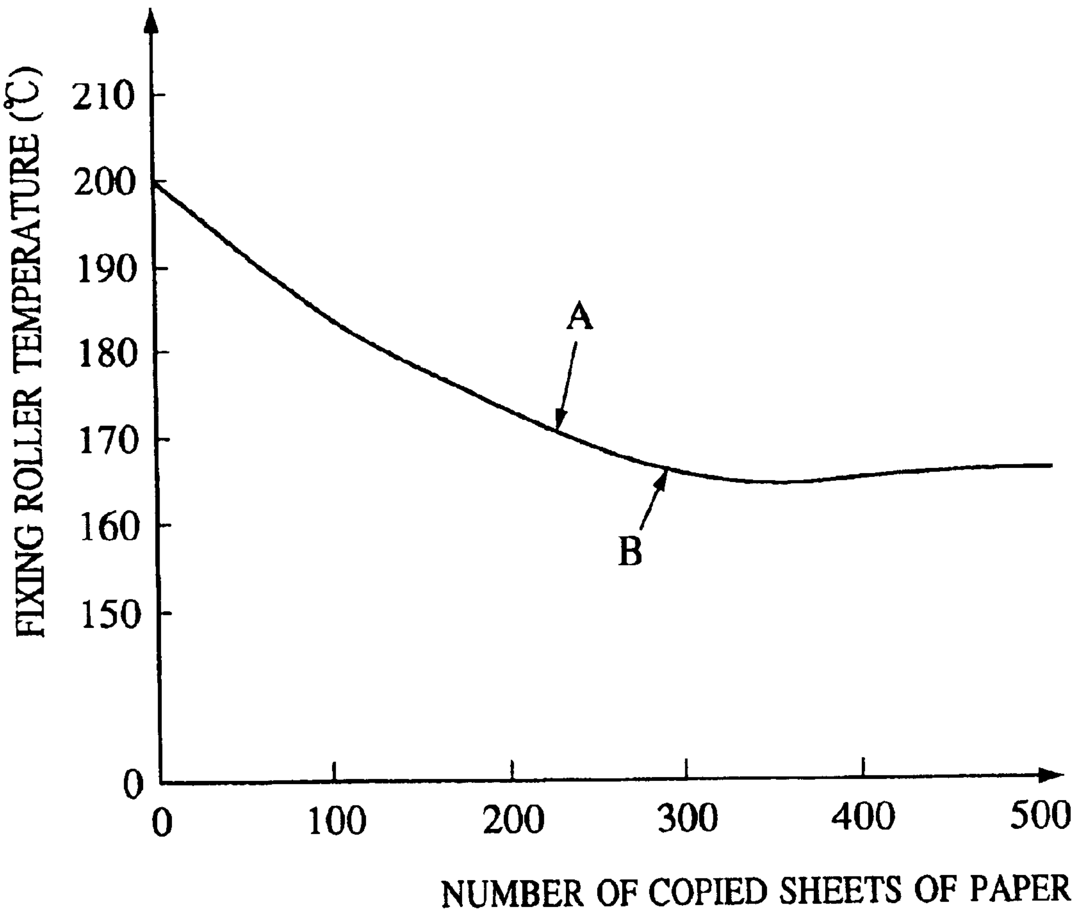
FIG. 5 is a graph showing a change in the surface temperature of the fixing roller during a process of continuously fixing a plurality of sheets of A4-size paper with a weight of 52 $g/m^2$ at an ambient temperature of 15° C.

Referring now to FIGS. 4 and 5, the advantages and effects of the present embodiment are described below with reference to experimental results performed by the present inventors.

FIG. 4 is a graph showing a change in the surface temperature of the fixing roller during a process of continuously fixing a plurality of sheets of A4-size paper with a weight of 90 g/m$^2$ employed as the recording media at an ambient temperature of 15° C., for three different conditions in terms of switching of the recording medium feeding speed.

In a comparative example 1, the recording medium feeding speed was switched when the temperature detected by the thermistor becomes equal to a predetermined value (=165° C.) regardless of the type of recording media. The resultant change in the surface temperature of the fixing roller is represented by an alternate long and short dash line. In a comparative example 2, the recording medium feeding speed was maintained unchanged.

The comparative examples 1 and 2 both correspond to the conventional method of controlling the temperature of the fixing roller during the process of fixing a plurality of recording media.

As can be seen from FIG. 4, when thick paper such as A4-size paper with a weight of 90 g/m$^2$ is employed, the paper absorbs a large amount of heat from the fixing roller during the fixing process and thus the surface temperature of the fixing roller drops at a high rate. Therefore, the timing of switching the recording medium feeding speed should be determined taking account the high reduction rate of the surface temperature.

From FIG. 4, it can also be seen that in the range from point A to B, it is possible to further fix a considerable number of recording media before the surface temperature of the fixing roller drops below the minimum allowable fixing temperature (=160° C.), and thus the recording medium feeding speed should be switched so as to utilize the full processing capacity of the apparatus depending on the number of remaining recording media to be fixed.

FIG. 5 is a graph showing a change in the surface temperature of the fixing roller during a process of continuously fixing a plurality of sheets of A4-size paper with a weight of 52 g/m$^2$ at an ambient temperature of 15° C. As can be seen from FIG. 5, in the case where thin paper such as A4-size paper with a weight of 52 g/m$^2$ is used, the surface temperature of the fixing roller drops at a rather low rate even when a considerably large number of recording media are fixed.

Thus, in the present embodiment, as can be seen from FIGS. 4 and 5, the switching temperature TD, at which the number of recording media fed per unit time is switched, is set depending on the reduction rate of the temperature detected by the thermistor during the continuous fixing process for a plurality of recording media so that the temperature of the fixing roller is maintained within the allowable range even when recording media which absorb a large amount of heat, such as thick paper, are continuously fixed. Furthermore, the paper feeding rate per unit time is determined in accordance with the number of remaining recording media to be fixed so that the fixing process is performed using the full capacity of the apparatus.

Values of various parameters employed herein in the present embodiment are selected by way of example only. The parameters may be set in various manners depending on the particular conditions and settings of the apparatus.

It is desirable that, of various parameters described above, N1 and N2 be automatically determined in accordance with the size of recording media.

On the other hand, the switching temperature TD may be set in various fashions, because the switching temperature TD may be selected from a greater number of values if the intervals among the values employed in the embodiment described above are further divided.

Although an electrophotographic copying machine is employed as the image forming apparatus in the present embodiment, similar advantages and effects may also be obtained when another image forming apparatus such as a laser beam printer or a facsimile machine is employed.

Second Embodiment

Figure 6:
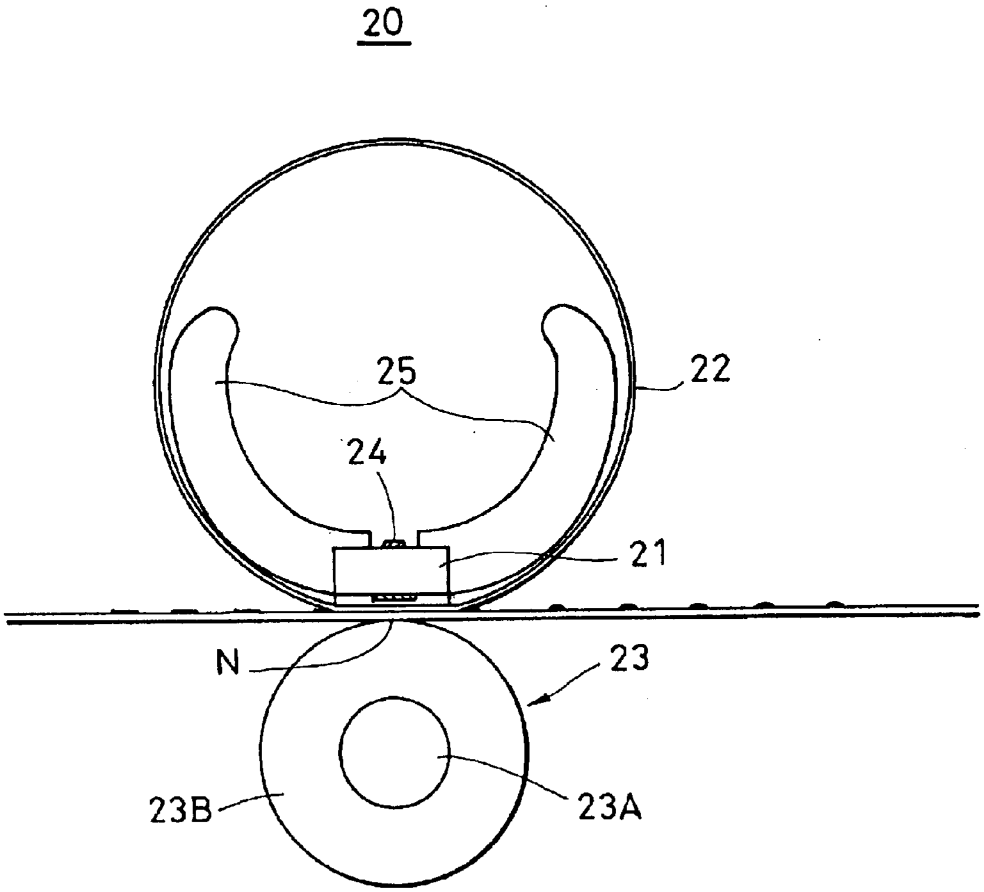
FIG. 6 is a cross-sectional view schematically illustrating the construction of a fixing apparatus according to the second embodiment of the invention.
Figure 7:
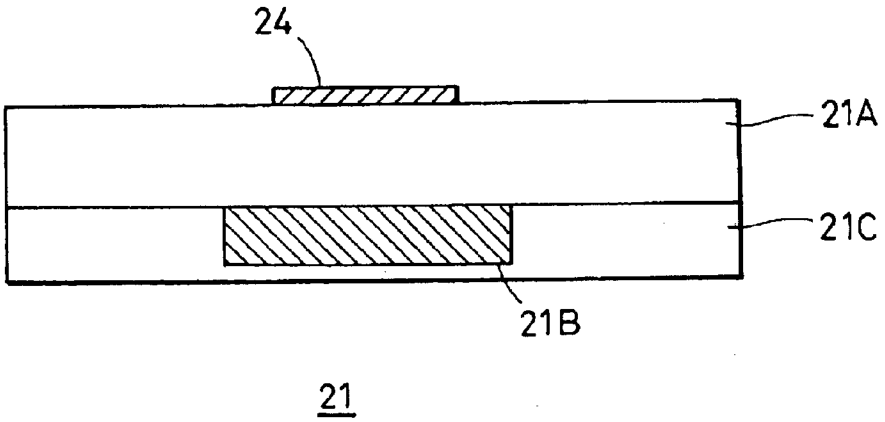
FIG. 7 is a cross-sectional view schematically illustrating the construction of the ceramic heater used in the fixing apparatus shown in FIG. 6.
Figure 8:
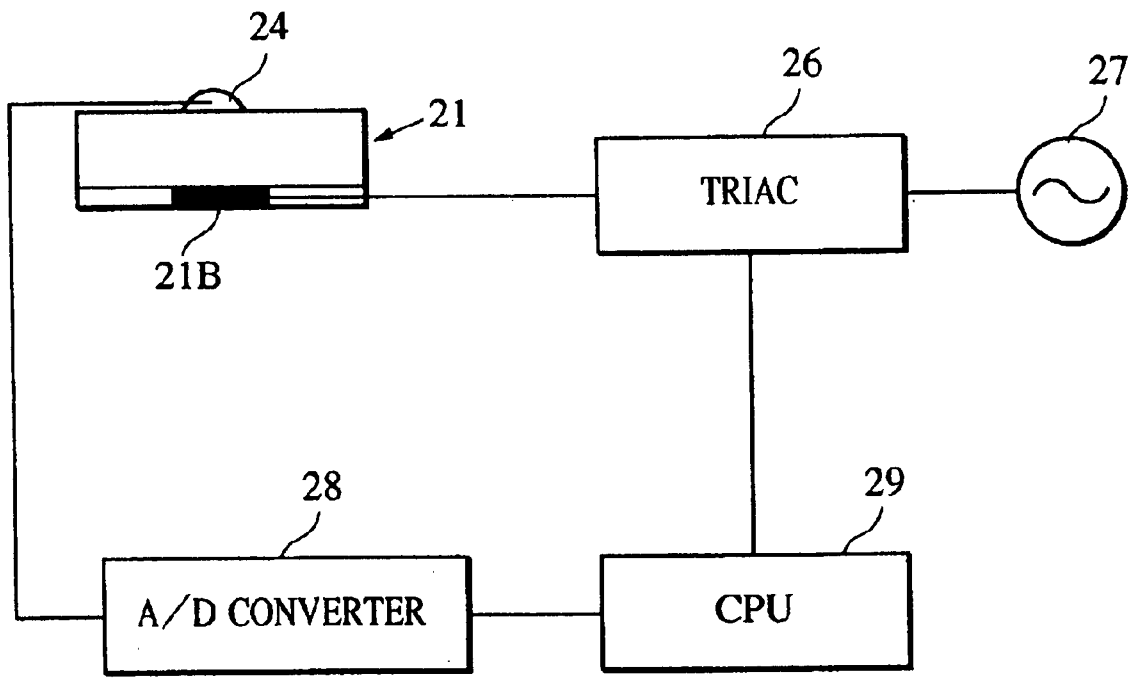
FIG. 8 is a block diagram schematically illustrating interconnections from the ceramic heater shown in FIG. 7 to peripheral means thereof.

Referring now to FIGS. 6 to 8, a second embodiment of the present invention is described below. The image forming apparatus employed in this second embodiment has a similar construction to that shown in FIG. 1 employed in the first embodiment, except for the fixing apparatus. Therefore, a duplicated description is not given here.

In this second embodiment, unlike the first embodiment in which the surface temperature of the fixing roller serving as the fixing member is detected, the temperature of a ceramic heater serving as the heating means is detected, and setting of the recording medium feeding speed reference and switching of the recording medium feeding speed are performed in accordance with the detected temperature of the ceramic heater.

In the present embodiment, the process of switching the recording medium feeding speed is performed in a similar manner to the first embodiment, and thus the process is not described here in further detail.

FIG. 6 is a cross-sectional view schematically illustrating the construction of a fixing apparatus (20) according to the second embodiment of the invention.

As shown in FIG. 6, the fixing apparatus 20 includes a ceramic heater 21 (hereinafter referred to simply as a heater 21) serving as heating means, an endless band-shaped fixing film 22 serving as a fixing member, a cylindrical- or substantially cylindrical-shaped rotatable pressure roller 23 serving as a pressure member, a thermistor temperature sensor (hereinafter referred to simply as a thermistor) 24 serving as a temperature detecting member, and a holder 25 for supporting the heater 21 and also guiding the fixing film 22 in a predetermined direction.

FIG. 7 is a cross-sectional view schematically illustrating the construction of the heater 21. As shown in FIG. 7, the heater 21 includes a thin plate-shaped substrate 21A made mainly of aluminum oxide, and a resistance heating element 21B formed mainly of Ag/Pd on one surface of the substrate 21A. A thermistor 24 is disposed in contact with the opposite surface of the substrate 21A. The former surface of the substrate 21A is coated with a protective layer 21C made mainly of glass or fluorocarbon resin so that the surface is protected from the fixing film 22 sliding on the surface.

FIG. 8 is a block diagram schematically illustrating interconnections from the heater 21 to peripheral means thereof. As shown in FIG. 8, the resistance heating element 21B is heated by electric power received from a commercial power supply 27 via a triac 26.

That is, when electric power from the commercial power supply 27 to the heater 21 is turned on, the resistance heating element 21B generates heat thereby heating a recording medium P on which an image to be fixed has been formed.

The fixing film 22 has an inner circumference slightly greater than the outer circumference of the holder 25 so that the fixing film 22 fits around the holder 25 without causing the fixing film 22 to have tension.

In the present embodiment, the fixing film 22 is formed into an endless two-layer band-shaped structure consisting of a polyimide base layer and a PTFE layer coated on the circumferential surface of the base layer.

The structure of the fixing film 22 is not limited to that employed in the present embodiment. For example, to achieve a low thermal capacity, the fixing film 22 may also be formed into a single-layer endless-band structure made of a heat-resistant material such as PTFE, PFA, or FEP or into a two-layer endless-band structure consisting of a base layer made of polyimide, polyamide-imide, PEEK, PES, or PPS and an upper layer made of PTFE, PFA, or FEP coated on the circumferential surface of the base layer.

The pressure roller 23 consists of a rotatable metal core 23A made of aluminum or similar metal in a cylindrical or substantially cylindrical shape and an elastic layer 23B of a high-releasbility material such as silicone rubber coated on the circumferential surface of the metal core 23A.

The pressure roller 23 is urged against the fixing film 22 by a pressure mechanism (not shown) disposed outside the fixing apparatus 20 so that a nip N through which a recording medium P having an image to be fixed is passed is formed between the fixing film 22 and the pressure roller 23 which is urged against the fixing film 22.

The pressure roller 23 is rotated in a counterclockwise direction by a driving mechanism (not shown) disposed outside the fixing apparatus 20 so that the fixing film 22 moves following the rotation of the pressure roller 23 thereby feeding the recording medium P nipped by the nip N from the right side to the left side of the figure whereby the image on the recording medium P is fixed by means of heat generated by the heater 21 thus forming a permanent image.

As shown in FIG. 8, the thermistor 24 is connected to a CPU 29 via an analog-to-digital converter 28 for converting input analog information into digital form.

In accordance with an output signal indicating temperature received from the thermistor 24, the CPU 29 controls the power supplied to the heater 21 so as to achieve a desired temperature.

Thus, the present embodiment also provides advantages and effects similar to those obtained in the first embodiment.

Third Embodiment

A third embodiment of the present invention is described below. The constructions of an image forming apparatus and a fixing apparatus used here are similar to those of the image forming apparatus and fixing apparatus employed in the first or second embodiment described above with reference to FIGS. 1 to 8, and thus a duplicated description is not given here.

In this third embodiment, unlike the first and second embodiments in which the recording medium feeding speed is switched on the basis of the number of recording media which can be fixed before the temperature of the circumferential surface of the fixing roller 8 or the temperature of the ceramic heater 21 drops by a predetermined amount, the recording medium feeding speed is switched on the basis of the length of elapsed time from the start of a continuous fixing process to the time at which a predetermined amount of reduction is detected in the temperature of the circumferential surface of the fixing roller 8 or the temperature of the ceramic heater 21.

Thus, in addition to the advantages and effects obtained in the first or second embodiment, the third embodiment of the invention further provides the advantage that the recording medium feeding speed can be properly switched without having to consider the effects of the size of the recording media and thus it is not required to detect the size of recording media.

Although the present invention has been described above with reference to specific embodiments, the invention is not limited to those embodiments. Various modifications can be made without departing from the spirit and scope of the invention.

What is claimed is:

1. An image fixing apparatus, comprising:

a fixing member for heat-fixing an unfixed image on a recording medium;

a detecting member for detecting a temperature of said fixing member;

control means for controlling a temperature of said fixing member based on an output of said detecting member, switching means for switching the feeding number of recording medium per unit time to a lower feeding number when a detected temperature drops to a reference temperature while continuously performing a plurality of fixing operations; and setting means for setting the reference temperature to switch the feeding number per unit time based on a temperature dropping rate of said fixing member.

2. A fixing apparatus according to claim 1, wherein said setting means makes the reference temperature higher as the dropping rate becomes larger.

3. A fixing apparatus according to claim 1, wherein the temperature dropping rate is determined on the basis of the number of recording medium which is fixed until the detected temperature reaches from a target temperature to the reference temperature.

4. A fixing apparatus according to claim 1, wherein said switching switches the feeding number per unit time by changing a feeding interval of the recording medium fed to said fixing member.

5. A fixing apparatus according to claim 1, wherein said switching switches the feeding number per unit time by changing a feeding speed of recording medium.

6. An image forming apparatus comprising:

unfixed image forming means for forming an unfixed image on a recording medium, wherein said image forming apparatus has a fixing member according to claim 1.

7. A fixing apparatus according to claim 1, further comprising a heater to which electric power is supplied and, which is provided adjacent to said fixing member, wherein said control means controls electric power supply to said heater.

8. A fixing apparatus according to claim 1, further comprising determining means for determining whether to switch the feeding number per unit time in accordance with the remaining number of the plurality of fixing operations when the detected temperature reaches the reference temperature.

9. A fixing apparatus according to claim 8, wherein said determining means maintains the feeding number per unit time of the existing condition when the remaining number of operations is smaller than a predetermined number of operations.

* * * * *

UNITED STATES PATENT AND TRADEMARK OFFICE

CERTIFICATE OF CORRECTION

PATENT NO. : 6,791,671 B1
DATED : September 14, 2004
INVENTOR(S) : Nobuhiro Hayashi et al.

It is certified that error appears in the above-identified patent and that said Letters Patent is hereby corrected as shown below:

Column 9,
Line 27, “switching” should read -- switching means --.

Column 10,
Line 4, “switching” should read -- switching means --.

Signed and Sealed this

Seventh Day of December, 2004

JON W. DUDAS
*Director of the United States Patent and Trademark Office*